455-296 SR
FIP8106 XR 3,622,895

United States Patent

[11] 3,622,895

[72] Inventors Donald Leroy Starkey
North Tonawanda, N.Y.;
Robert H. Zinsmeister, Newton, Mass.
[21] Appl. No. 14,392
[22] Filed Feb. 26, 1970
[45] Patented Nov. 23, 1971
[73] Assignee GTE Sylvania Incorporated

[54] UNIVERSAL DIGITAL LINE RECEIVER EMPLOYING FREQUENCY CONVERSION TO ACHIEVE ISOLATION
2 Claims, 4 Drawing Figs.

[52] U.S. Cl. .......... 329/104, 307/236, 325/320, 325/321, 328/119, 329/50
[51] Int. Cl. .......... H03k 9/00
[50] Field of Search .......... 329/50, 104; 325/320, 321; 328/140, 118, 119; 307/236

[56] References Cited
UNITED STATES PATENTS

| | | | |
|---|---|---|---|
| 2,985,840 | 5/1961 | Theodore et al. | 329/50 X |
| 2,800,580 | 7/1957 | Davies | 328/119 X |
| 3,383,600 | 5/1968 | Calfee | 329/104 X |
| 3,007,043 | 10/1961 | Rennenkampf | 329/104 X |
| 3,315,252 | 4/1967 | Melvin | 307/236 X |

*Primary Examiner*—Alfred L. Brody
*Attorneys*—Norman J. O'Malley, Elmer J. Nealon and Robert T. Orner

ABSTRACT: A universal digital line receiver employs an oscillator having an output signal, the frequency of which is substantially greater than the binary rate of a digital input signal to the line receiver. A transformer-coupled balanced mixer, to which the digital input signal is directed, has an input connection from the oscillator and is operative in response to the digital input signal to transfer a portion of the oscillator signal to a detector. The detector, which also has an input connection from the oscillator, provides an isolated replica of the input digital signals.

PATENTED NOV 23 1971 3,622,895

INVENTORS
DONALD L. STARKEY
ROBERT H. ZINSMEISTER
BY
ATTORNEY

INVENTORS
DONALD L. STARKEY
ROBERT H. ZINSMEISTER
BY
Robert T. Orner
ATTORNEY

UNIVERSAL DIGITAL LINE RECEIVER EMPLOYING FREQUENCY CONVERSION TO ACHIEVE ISOLATION

BACKGROUND OF THE INVENTION

This invention relates to digital receivers and in particular to digital line receivers having input terminals connected to a transmission line such as a pair of wires.

Line receivers may be employed in such devices as teletype receivers where the input digital data may not only vary over wide ranges of amplitude but also have different polarities. Line receivers of this type must provide direct current (DC) isolation between the input terminals and the line receiver power supplies while at the same time sensing DC input voltage and/or current levels. Known-type receivers employ sensing devices such as DC current relays or chopper amplifiers. The DC current relay, such as a teletype relay, has obvious limitations of low-frequency response and sensitivity to large fluctuations in temperature. The chopper amplifiers on the other hand not only have complex amplifier modules requiring floating power supplies but also have a susceptibility to conducted radiofrequency interference (RFI) at the chopping frequency.

It would therefore be advantageous to have and it is an object of this invention to provide a line receiver having an improved frequency response, temperature stability and improved DC isolation.

SUMMARY OF THE INVENTION

A line receiver according to the present invention for detecting a predetermined digital signal includes oscillator means operative to generate a signal having a frequency substantially greater than the frequency of the predetermined digital signal. The predetermined digital signal may be a neutral signal or a polar signal. A neutral signal is defined as one having either positive or negative going pulses, and a polar signal is one having both positive and negative going pulses. Isolating means having a first input connection from the oscillator means, a second input connection from an input terminal of the line receiver and an output connection to a detector means is operative in response to the predetermined digital signal to transfer a portion of the output signal of the oscillator means to the detector means. The detector means produces an output signal corresponding to the predetermined digital signal.

BRIEF DESCRIPTION OF THE DRAWINGS

The construction and operation of a line receiver according to the present invention will be more fully understood from the following detailed description taken in conjunction with the accompanying drawings in which.

DETAILED DESCRIPTION OF THE INVENTION

Figure 1:
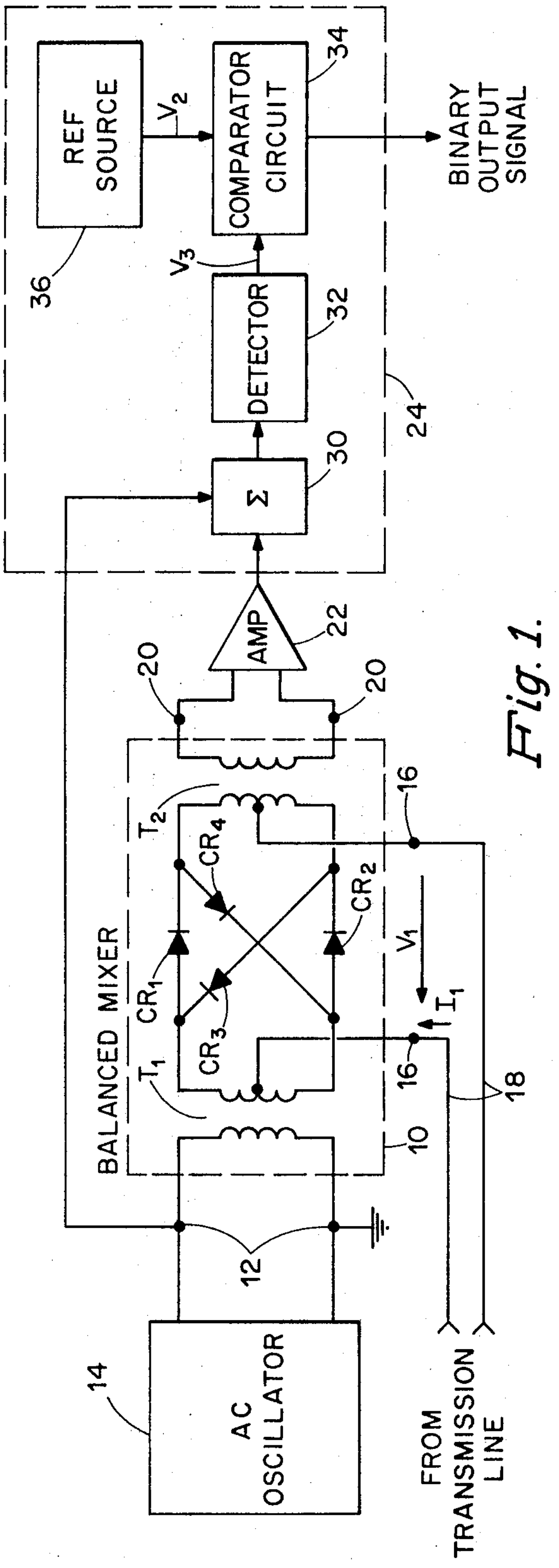
FIG. 1 is a diagrammatic representation of a preferred embodiment of a line receiver according to the present invention.

An embodiment of a line receiver according to the present invention is shown in FIG. 1 and includes an isolation means such as the balanced mixer 10 having a first set of input connections 12 connected to an oscillator means such as the AC oscillator 14, a second set of input connections 16 connected to an input transmisson line 18 and a set of output connections 20 connected to the input of an amplifier circuit 22. The output of the amplifier 22 is connected to the input connection of a detector means 24.

THe balanced mixer 10 includes a first transformer $T_1$ having a primary winding connected to the first set of input connections 12 and a secondary winding having a center tap connected to one of the second input connections 16. A second transformer $T_2$ has a center-tapped primary winding connected through a pair of diodes $CR_1$ and $CR_2$ across the secondary winding of the first transformer $T_1$. Connected between the common juncture of the secondary winding of the first transformer $T_1$ and the diode $CR_1$ and the common juncture of the primary winding of the second transformer $T_2$ and the second diode $CR_2$ is a third diode $CR_3$. Similarly a fourth diode $CR_4$ is connected between the common juncture of the secondary winding of the first transformer $T_1$ and the second diode $CR_2$ and the common juncture of primary winding of the second transformer $T_2$ and the diode $CR_1$. The four diodes $CR_1$, $Cr_2$, $CR_3$and $CR_4$ are connected in a balanced bridge configuration between the secondary winding of the first transformer $T_1$ and the primary winding of the second transformer $T_2$. The center tap of the primary winding of the second transformer $T_2$ is connected to the other one of the second set of input connections 16.

One embodiment of a detector means 24 includes a conventional summation circuit 30 having input connections from the AC oscillator 14 and the amplifier circuit 22 and an output connection to any well-known detector circuit 32, the output of which is connected to a first input connection of a comparator circuit 34 (well know in the art). A DC voltage reference source 36 is connected to a second input connection of the comparator circuit 34.

Under quiescent conditions the AC oscillator 14 is generating a continuous wave signal of frequency $f_1$ at the first input connection 12 of the balanced mixer 10. The balanced mixer 10 is a transformer-coupled diode bridge balanced mixer which has the requisite isolation between the second input connections 16 and the first input connections 12 and the output connections 20. The AC signal at the first input connections 12 causes the diodes of the bridge to be in the conducting state. AS is well known, the signal at the output connections 20 is substantially zero because the current through the diodes $CR_1$, $CR_2$, $CR_3$, and $CR_4$ are equal causing equal and opposite currents to appear at the primary winding of the second transformer $T_2$.

Figure 2:
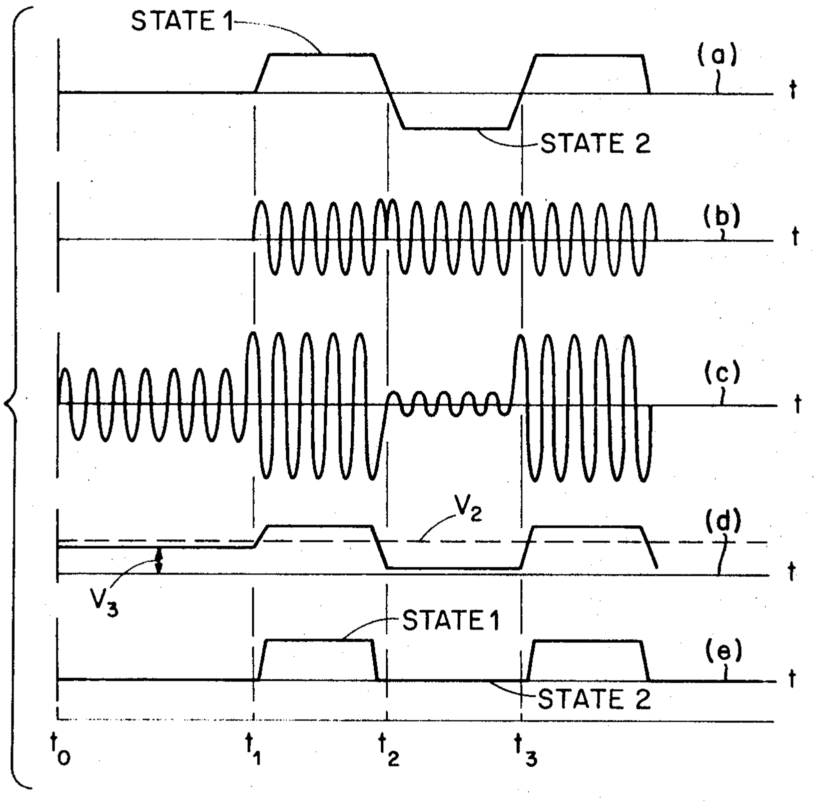
FIG. 2 is a plurality of waveforms useful in explaining the operation of the embodiment of FIG. 1 with a polar input signal.

Referring to the waveforms of FIG. 2, assume a binary signal, shown in waveform (*a*), is propagated along the transmission line 18 to the second input connection 16 of the balanced mixer 10. Assume further that the binary signal is polar in form although other forms of signals may be employed, as will be discussed hereinbelow. A polar signal has two states, one state being defined as $I_1>0$ (or $V>0$) and the second state being defined as $I_1<0$(or $V<0$). The application of a current $I_1$(or a DC voltage $v$) at the input connection 16 causes an unbalance of the diode bridge. Thus the currents in $CR_1$ and $CR_2$ exceed the currents in $CR_3$ and $CR_4$ causing an AC signal current of frequency $f_1$ and at level $I_1$ to flow in the primary winding of the second transformer $T_2$ (see waveform (*b*) of FIG. 2).

When the input binary signal changes from state 1 to state 2, there is a 180° phase reversal of the current signal $I_1$ in the primary winding of the second transformer $T_2$. Similarly when the binary input signal changes from state 2 to state 1, the phase of the current signal $I_1$ reverses to the original phase. Therefore the current signal $I_1$ during state 1 has one phase and in state 2 has a second phase 180° from the phase of state 1.

The output signal, as shown in wave form (*b*) of FIG. 2, from the balanced mixer 10 is directed through the amplifier 22 to the detector means 24. In the embodiment of the detector means 24 shown in FIG. 1, the output voltage of the balanced mixer after amplification, if necessary, is summed at the summation circuit 30 with a sample of the AC oscillator signal to thereby form a composite signal, shown in waveform (*c*) of FIG. 2. During the time intervals that the input signal is in state 1, the balanced mixer output voltage is in phase with the oscillator output signal, and therefore the output signal of the summation circuit 30 is the phase sum of the two signals. During the time interval of state 2, $t_2$ through $t_3$, the balanced mixer output signal is 180° out of phase with the oscillator signal thereby resulting in substantial cancellation of the signals at the summation circuit 30. Some residual signal may exist during the state 2 time interval due to either a bridge unbalance and/or incomplete cancellation.

The resultant output signal, as shown in waveform (*c*) of FIG. 2, of the summation circuit 30 is directed to the first detector 32, the output signal of which is shown as waveform (*d*) of FIG. 2 The output signal of the first detector 32 will have substantially the same envelope wave shape as the first summation circuit output signal including a DC component during the time interval of state 2. Note also that during the time interval $t_o$ to $t_1$, when no binary input signal is applied to the line receiver, the AC oscillator signal is directed through the summation circuit 30 to the detector 32 where the signal is converted to a DC level $V_3$.

When the detector output signal, as shown in waveform (*d*) of FIG. 2, exceeds the reference voltage $V_2$ from the reference source 36, shown as the dashed line in waveform (*d*) of FIG. 2, the comparator circuit 34 generates a fixed amplitude signal that is compatible with the data-processing circuitry that is to be connected to the comparator circuit output connection.

Figure 3:
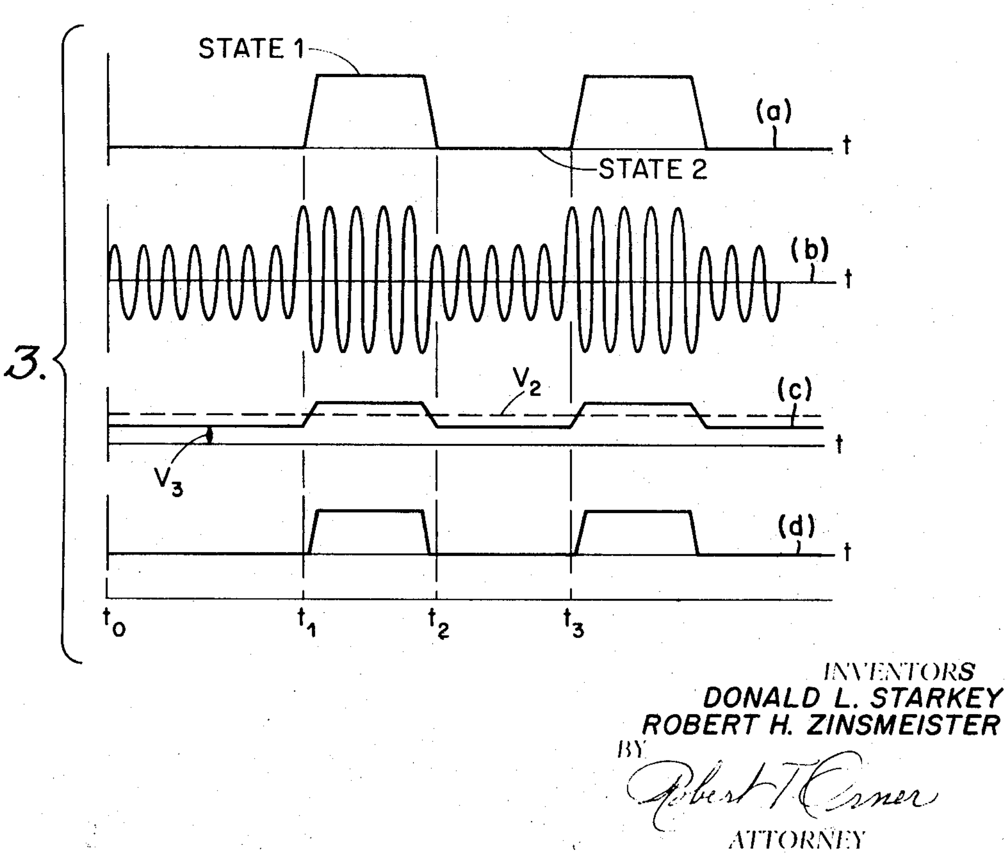
FIG. 3 is a plurality of waveforms useful in explaining the operation of the embodiment of FIG. 1 with a neutral input signal.

In addition to the polar signal, the universal line receiver must process neutral signals i.e. one state, state 2 being defined as no input current and the second state, state 1, being defined as some level of input current $I_1$ (or voltage V). An example of a neutral signal is shown in waveform (*a*) of FIG. 3. While a positive-going signal is used for illustration, a negative-going signal will also be processed by the universal receiver shown in FIG. 1, as will be explained hereinbelow. Under quiescent conditions, the time interval $t_0$ to $t_1$, the summation circuit 30, the output signal of which is depicted in waveform (*b*) of FIG. 3, is directing the AC oscillator signal to the detector 32 where it is converted to a DC level $V_3$. The detector output signal is depicted as waveform (*c*) in FIG. 3. Since the detector DC level $V_3$ is less than the DC reference source signal $V_2$, the comparator output signal, waveform (*d*) of FIG. 3, is zero.

At time $t_1$ a positive binary signal, received at the balanced mixer input terminal 16, unbalances the diode bridge causing an in-phase signal to be directed to the summation circuit 30 and added to the AC oscillator signal to produce the composite signal shown in waveform (*b*). During the time interval $t_1$ to $t_2$, while the detector output signal, waveform (*d*) of FIG. 3, exceed the reference voltage signal $V_2$, the comparator circuit 34 generates an output signal as shown in waveform (*e*) of FIG. 3. Note that the rise time of the comparator output signal is an improvement over the input binary signal. This result is achieved because the output signal of the comparator circuit 34, such as a Schmitt trigger circuit, is not dependent upon the input waveform during the time interval that the input waveform is above the threshold voltage level $V_2$.

A negative-going binary signal is processed in the universal line receiver by either reversing the input connection 16 such that the negative-going signal produces the in-phase signal or by making the reference signal level $V_2$ less than $V_3$ such that the comparator 34 is turned off when the detector output level falls below the reference level $V_2$.

Figure 4:
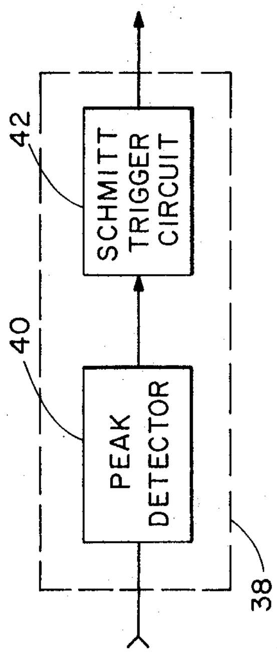
FIG. 4 is a second embodiment of a detector means to be employed in the embodiment of FIG. 1.

A second embodiment of a detector means 38 that can be employed in the embodiment of FIG. 1 is shown in FIG. 4 and includes a well-known peak detector circuit 40 connected in series with a Schmitt trigger circuit 42. The detector means 38 does not include the summation circuit 30 nor the input connection from the AC oscillator 14. Furthermore the well-known Schmitt trigger has a built-in threshold corresponding to the reference source signal $V_2$. As will be apparent, the detector means 38 is only employed when neutral binary signals (positive or negative signals) are received but cannot be employed in the case of a polar binary input signal without the addition of a phase-sensing means.

The operation of the detector means 38 of FIG. 4 in combination with the oscillator 14 and the balanced mixer 10 of FIG. 1 is similar to the operation of the line receiver described hereinabove. A neutral binary signal is received at input connections 16 of the balanced mixer 10 resulting in an unbalance of the balanced bridge configuration thereby causing an AC signal to be transferred from the AC oscillator 14 through the balanced mixer 10 to the peak detector 40 of the detector means 38. As long as the detector output signal (the envelope of the AC signal) exceeds the threshold level $V_2$ of the Schmitt trigger, the desired output signal is generated.

If the neutral binary signal alternates between a positive level and zero, the AC signal at the detector means will have one phase, and if the neutral binary signal alternates between a negative level and zero, the AC signal at the detector means 38 will be of the opposite phase. Since the detector means 38 is not phase sensitive, it may be employed with either a positive or negative level input signal but not with a polar input signal.

While there has been shown and described what are considered preferred embodiments of the present invention, it will be obvious to those skilled in the art that various modifications and changes may be made therein without departing from the invention as defined by the appended claims.

What is claimed is:

1 A digital line receiver comprising:

input terminals adapted to receive a predetermined digital signal;

oscillator means operative to generate a signal having a frequency greater than the frequency of the predetermined digital signal;

isolating means having a first input connection from said oscillator means, a second input connection from the input terminals and an output connection, said isolating means being operative in response to said predetermined digital signal at said second input connection to transfer energy of a predetermined phase from said oscillating means to the output connection from said isolating means; and detector means having a first input connection from said oscillator means and a second input connection from the output connection of said isolating means and being operative to produce an output signal corresponding to said predetermined digital signal, said detector means including a summation circuit having a first input connection from said oscillator means and a second input connection from the output connection of said isolating means and an output connection, said summation circuit being operative to add the signals received at said first and second input connections to thereby generate a composite signal at its output connection, a detector circuit having an input connection connected to the output connection of said summation circuit an an output connection and being operative to detect the envelope of the composite signal from said summation circuit, a reference source operative to generate a reference signal, and a comparator circuit having a first input connection connected to the output connection of said detector circuit and a second input connection connected to said reference source and being operative to generate a pulse of predetermined amplitude when the envelope of the composite signal at its first input connection exceeds the signal from said reference source.

2. A digital line receiver according to claim 1 wherein said isolating means is a balanced mixer including:

a first transformer having a primary winding connected to said oscillator means and a secondary winding having a center tap connected to one of said input terminals of said digital line receiver;

a second transformer having a center-tapped primary winding with the center tap connected to another of said input terminals of said digital line receiver and a secondary winding connected to said detector means;

a first diode connected in a predetermined manner between one end of the secondary winding of said first transformer and one end of the primary winding of said second transformer;

a second diode connected in a predetermined manner between the other end of the secondary winding of said first transformer and the other end of the primary winding of said second transformer;

a third diode connected in a predetermined manner between the common juncture of the first diode and the one end of the secondary winding of said first transformer and the common juncture of the second diode and the other end of the primary winding of said second transformer; and a fourth diode connected in a predetermined manner between the common juncture of the second diode and the other end of the secondary winding of said first transformer and the common juncture of the first diode and the one end of the primary winding of said second transformer, said first, second, third and fourth diodes forming a balanced bridge configuration between the center-tapped secondary winding of said first transformer and the center-tapped primary winding of said second transformer, said balanced mixer being operative in response to said predetermined digital signal at the center taps of the secondary winding of said first transformer and the center-tapped primary winding of said second transformer to transfer a signal from said oscillator means to said detector means.

* * * * *